United States Patent
Petkov (10) Patent No.: US 10,311,631 B2
(45) Date of Patent: Jun. 4, 2019

(54) LIGHT PATH FUSION FOR RENDERING SURFACE AND VOLUME DATA IN MEDICAL IMAGING

(71) Applicant: Siemens Healthcare GmbH, Erlangen (DE)

(72) Inventor: Kaloian Petkov, Lawrenceville, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 99 days.

(21) Appl. No.: 15/593,411

(22) Filed: May 12, 2017

(65) Prior Publication Data
US 2018/0330538 A1    Nov. 15, 2018

(51) Int. Cl.
| | |
|---|---|
| *G06T 15/50* | (2011.01) |
| *G06T 1/20* | (2006.01) |
| *G06T 15/06* | (2011.01) |
| *G06T 15/08* | (2011.01) |

(52) U.S. Cl.
CPC ............ *G06T 15/50* (2013.01); *G06T 1/20* (2013.01); *G06T 15/06* (2013.01); *G06T 15/08* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 8,094,152 B1 | 1/2012 | Myers et al. | |
| 9,704,283 B2* | 7/2017 | Ozdas | G06T 15/08 |
| 2004/0125103 A1* | 7/2004 | Kaufman | G06T 15/06 |
| | | | 345/419 |
| 2007/0206008 A1* | 9/2007 | Kaufman | G06T 15/06 |
| | | | 345/424 |
| 2012/0306878 A1* | 12/2012 | Wang | G06T 15/50 |
| | | | 345/426 |
| 2013/0135306 A1* | 5/2013 | Engel | G06T 15/06 |
| | | | 345/423 |
| 2015/0213630 A1* | 7/2015 | Szirmay-Kalos | G06T 11/006 |
| | | | 382/131 |
| 2017/0000567 A1* | 1/2017 | Kim | A61B 10/0233 |
| 2018/0225862 A1* | 8/2018 | Petkov | G06T 15/06 |
| 2018/0286136 A1* | 10/2018 | Jones | G06F 3/012 |

FOREIGN PATENT DOCUMENTS

WO    WO2017039664 A1    3/2017

OTHER PUBLICATIONS

European Extended Search Report (EESR) dated Sep. 17, 2018 in corresponding European Patent Application No. 18171081.5.
(Continued)

*Primary Examiner* — Ryan M Gray (57) ABSTRACT

For visualization in medical imaging, a hybrid volume and surface renderer uses unified path tracing. Rather than separately rasterizing the surface and path tracing the volume, a same path or set of paths is used for both the volume and the surface. The path tracing accounts for scattering by the surface as well as the volume. Given the repetition of stochastic scattering of many modeled photons or light rays, using stochastic scattering from the surface as part of the path tracing for the volume allows for two-way interaction between the surface and volume.

19 Claims, 3 Drawing Sheets

(56) References Cited

OTHER PUBLICATIONS

SCRATCHAPIXEL: "An overview of the ray-tracing rendering technique", Mar. 24, 2017 (2017-83-24), XP055504164; Retrieved from the Internet: URL:https://www.scratchapixel.com/lessons/3d-basic-rendering/ray-tracing-overview/light-transport-ray-tracing-whitted.
Levoy M: "A hybrid ray tracer for rendering polygon and volume data"; IEEE Computer Graphics and Applications, IEEE Service Center, New York, NY, US, vol. 10, No. 2, Mar. 1, 1990 (1990-83-01), pp. 33-40.
Vedad Hulusic et al: "Acoustic Rendering and Auditory-Visual Cross-Modal Perception and Interaction"; Computer Graphics Forum, Feb. 1, 2012 (Feb. 1, 2012), pp. 102-131.
Bavoil, Louis, and Kevin Myers. "Order independent transparency with dual depth peeling." NVIDIA OpenGL SDK (2008): 1-12.
Dayal, Abhinav, et al. "Adaptive frameless rendering." ACM SIGGRAPH 2005 Courses. ACM, Jul. 2005.
Karras, Tero, and Timo Aila. "Fast parallel construction of high-quality bounding volume hierarchies." Proceedings of the 5th High-Performance Graphics Conference. ACM, Jul. 2013.
Schott, Mathias, et al. "Ambient occlusion effects for combined volumes and tubular geometry." Visualization and Computer Graphics, IEEE Transactions on 19.6 (2013): 913-926.
Karras, Tero, and Timo Aila. "Fast parallel construction of high-quality bounding vol. hierarchies." Presentation. ACM, downloaded Jul. 24, 2015.

\* cited by examiner

LIGHT PATH FUSION FOR RENDERING SURFACE AND VOLUME DATA IN MEDICAL IMAGING

BACKGROUND

The present embodiments relate to medical imaging. In medical imaging, the interior of a patient is scanned. Various approaches are possible, such as magnetic resonance (MR), computed tomography (CT), x-ray, fluoroscopy, ultrasound, positron emission tomography (PET), or single photon emission computed tomography (SPECT). Three-dimensional (3D) visualization is a common practice to assess and record the internal conditions of patients. For 3D visualization, volumetric effects model a wide variety of natural and non-natural phenomena.

3D visualization may be difficult for medical imaging, particularly where the volume data from the scan is rendered with an added surface (e.g., a surface representing a model of an object in the scan volume of the patient). Rendering of surfaces embedded in a volume remains a challenging problem in the traditional volume visualization systems. Several techniques exist (e.g., depth merging and two-way coupling) that implement specific types of global illumination effects near the intersections of the two types of data (e.g. surface transparency, volumetric shadows, or ambient occlusions). The separately handled volume and surface data require complex computations during rendering. For opaque surfaces, existing renderers may use rasterization and apply the resulting depth buffer during volume integration. The resulting rendered volume is then composited over the rasterization result. Multi-pass rendering techniques, such as depth peeling, provide support for embedded transparent surfaces at a significant performance cost. Depth merging of surface data within volume rendering works reasonably well for traditional ray casting, but semi-transparent surfaces need special handling, such as building linked lists per pixel for all surfaces encountered during ray casting through the volume. These techniques partially model the interaction between the volume data and the surface data for a specific visual effect. The techniques fail to capture the full light interaction between the surface and the volume.

SUMMARY

By way of introduction, the preferred embodiments described below include methods, systems, instructions, and computer readable media for visualization in medical imaging. A hybrid volume and surface renderer uses unified path tracing. Rather than separately rasterizing the surface and path tracing the volume, a same path or set of paths is used for both the volume and the surface. The path tracing accounts for scattering by the surface as well as the volume. Given the repetition of stochastic scattering of many modeled photons or light rays, using stochastic scattering from the surface as part of the path tracing for the volume allows for two-way interaction between the surface and volume.

In a first aspect, a system is provided for visualization of surface and volume information in medical imaging. A medical imaging system is configured to scan an internal region of a patient and generate voxel data representing a volume comprising the internal region. A memory is configured to store a three-dimensional surface within the volume. A renderer is configured to generate a light ray path through the volume as part of path trace rendering, check for the three-dimensional surface along the light ray path, and, where the light ray path does not scatter or terminate based on the voxel data prior to the three-dimensional surface, determine scatter from the three-dimensional surface. A display is configured to display a rendered image output by the renderer and based on the path-trace rendering. The rendered image represents the internal region and the three-dimensional surface.

In a second aspect, a method is provided for or visualization of surface and volume information in medical imaging. Light rays are path traced through a volume with stochastic-based scattering for voxels of the volume. Intersections of the light rays used for the path tracing with a surface positioned in the volume are determined. The light rays are stochastically scattered from the surface for the intersections. A medical image of the patient is generated based on the path tracing and scattering for the voxels and for the surface.

In a third aspect, a method is provided for or visualization of surface and volume information in medical imaging. A sequence of voxels representing a patient volume over time are acquired from a medical scanner. A light ray path of a plurality of different vectors through the patient volume is generated. At least one of the vectors is based on scatter from a surface, and at least one of the vectors is based on scatter from a first voxel of the voxels. An image is generated from the light ray path.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Surface/volume hybrid models are visualized in medical imaging. Such hybrid models arise in several medical visualization applications (e.g., visualizing segmentation surfaces or displaying medical tools in surgical simulations). Many existing medical volume rendering systems have limited or specialized support for semi-transparent embedded surfaces and model only a limited subset of light interactions between the volume and the surface.

One type of rendering is path tracing (e.g., physically-based visualization or photorealistic rendering), which models light rays or photons interacting with (scattering, being absorbed, passing through, or terminating in) the volume.

Path tracing mimics real-world interaction of light with voxels of a volume. The interaction is handled stochastically (e.g., Monte-Carlo simulation), so many light paths formed of many different vectors are modeled to render an image. Monte Carlo path tracing is a useful rendering technique for light transport computations where the natural light phenomena are modeled using a stochastic process. Evaluation of the rendering integral in physically-based volume rendering may require thousands of stochastic samples per pixel to produce an acceptably noise-free image. The physically-based volume rendering results in physically plausible images that are often easier for the human brain to interpret when compared to the more analytical images from traditional volume rendering, such as single-pass ray casting.

To integrate one or more surfaces in the physically-based visualization, the light paths are fused for both the surface and volume data. Rather than separate rendering, unified Monte Carlo-based path tracing is provided. Shared light scattering computation is used in the handling of the hybrid volume/surface data in the context of the Monte Carlo-based path tracing, enabling photorealistic visualization of both the volume and surface.

Path tracing with unified handling of both volume and surface data types enables advanced visual effects that are not possible with traditional volume rendering or rasterization systems. For medical visualization where the volumetric data plays a major role and the clarity of the visualization is a critical requirement, the rendering of embedded surfaces is unified with the volumetric rendering. Using a unified path tracing-based rendering system accurately computes the light interaction between the volumetric data and surface data. This allows for special effects to improve the visual analysis of the data. The surface interface in the unification supports shader-based surface effects, such as wireframe rendering. The unification does not require any complex per-effect handling. For example, if the wireframe shader is applied to the embedded surface, then the unified path tracing produces the correct wireframe-like shadow onto the volume without any specialized coupling.

The system may be used in non-medical imaging environments. Any applications using 3D rendering of hybrid volume and surface data, such as computational fluid dynamics, computer assisted design, or manufacturing, may benefit from the ability to handle complex and accurate interactions between a surface and volume in physically-based rendering.

The system may further leverage massively parallel GPU or other hardware to allow for photorealistic rendering at interactive speeds. The challenge of visualizing the surface/volume hybrid models is addressed through a GPU-based rendering framework, but other renderers may be used.

Figure 1:
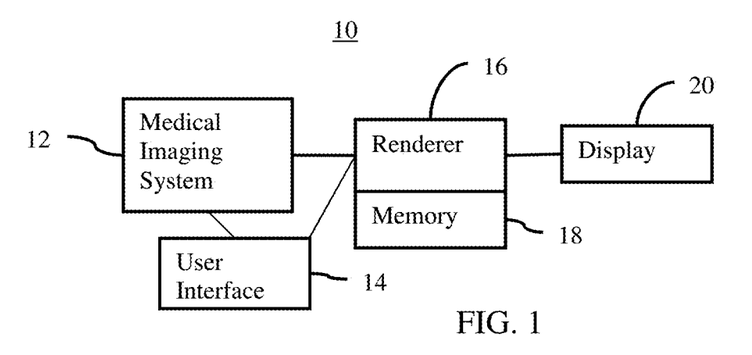
FIG. 1 is a block diagram of one embodiment of a system for visualization of surface and volume information in medical imaging.

FIG. 1 shows one embodiment of a system 10 for visualization of surface and volume information in medical imaging. The system 10 renders volume/surface hybrid models for medical visualization using path tracing. Given the variation and subtly of structure in a patient volume, variance of tools or other objects modeled or detected in the patient, and lighting difficulties in the volume, the unified path tracing of the hybrid model allows for various effects appropriate for many different applications. Rather than limiting useful effects by separate surface rendering with rasterization, the same light paths for path tracing the volume are used to detect the surface.

The system 10 includes a medical imaging system 12, a user interface or input 14, a renderer 16, a memory 18, and a display 20. Additional, different, or fewer components may be provided. For example, a network or network connection is provided, such as for networking with a medical imaging network or data archival system. As another example, the user interface 14 is not provided.

The user interface 14, renderer 16, memory 18, and display 20 are part of the medical imaging system 12. Alternatively, the user interface 14, renderer 16, memory 18, and/or display 20 are part of an archival and/or image processing system, such as associated with a medical records database workstation or server. In other embodiments, the user interface 14, renderer 16, memory 18, and/or display 20 are a separate computer, such as desktop or laptop, a workstation, a server, a network, or combinations thereof. The user interface 14, renderer 16, memory 18, and display 20 may be parts of different systems, such as the memory 18 being in a picture archiving and communications system (PACS), the renderer 16 being part of a workstation, and/or the display 20 being an imaging system or radiological display.

Figure 4:
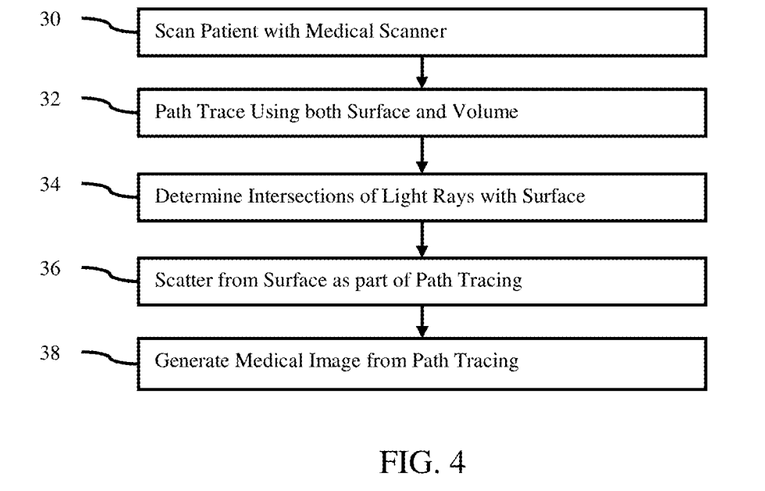
FIG. 4 is a flow chart diagram of one embodiment of a method for visualization of surface and volume information in medical imaging.

The system 10 is configured to implement the method of FIG. 4. Alternatively, other methods are implemented.

Any medical imaging system 12 may be used. For example, the medical imaging system 12 is a CT, MR, ultrasound, x-ray, fluoroscopy, or emission tomography (i.e., functional imaging such as PET or SPECT) system. The medical imaging system 12 is any now known or later developed medical imaging system. The medical imaging system 12 is configured by hardware, firmware, and/or software to scan the internal region of a patient and generate voxel data representing a scanned volume of the internal region.

Figure 2:
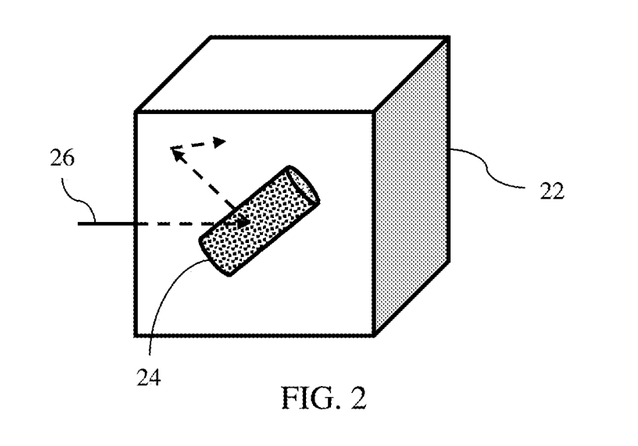
FIG. 2 illustrates an example embodiment of a volume, surface, and light path.

The medical imaging system 12 is configured to scan an internal region of the patient. The surface or skin of the patient may also be scanned or may not be scanned. Any portion or extent of the patient may be scanned, such as a scan of an organ, torso, extremity, or full body. The scan acquires data representing the interior of the patient. The represented portion includes a volume or three-dimensional distribution of response from the patient. FIG. 2 shows an internal region 22 as a cube, but the scanned volume of the patient may have any shape.

The medical imaging system 12 is configured to scan the patient to acquire at least one set of data. The set or frame of data represents the internal region of the patient at a specific time or period. A static volume is acquired. Alternatively, the scanning is repeated or performed in an ongoing manner to acquire a sequence of sets of voxel data for rendering a sequence. Each set represents the volume at a given time or period, so the sequence represents the volume over time (3D+t or 4D data). Any frame or volume rate may be provided. For real-time rates, at least 10 volumes or sets of voxel data are acquired each second. Greater or lesser volume rates may be provided.

In another embodiment, the medical imaging system 12 acquires multiple volumes representing the same internal region or overlapping internal regions. Due to scanner or patient movement, comparison of scans from different times, or other medical specific variation, different sets of data may be acquired for rendering together. As another example, sets of voxel data from different scanning modalities (e.g., MR and ultrasound) are to be rendered together.

The scan data may be output as a 3D reconstruction or data representing a volume. Alternatively, the acquired scan data is reconstructed to represent the volume. For example, Fourier processing is applied to k-space data in MR to reconstruct the volume. As another example, computed tomography is used to reconstruct the volume (e.g., SPECT, or CT). In yet another example, data representing three dimensions in a scan format is interpolated to a regular or other grid, such as a Cartesian coordinate grid. Each datum is associated with a different volume location (voxel) in the patient volume and assigned a scalar intensity.

The data from the scan is formatted as voxels in an isotropic grid. For example, voxels in a 512×512×512 Cartesian grid are used. Anisotropic grids may be used. Other formats may be used, such as the data representing locations in a polar coordinate format. For each voxel or location, a scan response is provided by a scalar value (e.g., 16-bit dynamic range), but other representations may be used, such as RGB values.

Given the number of different types of medical imaging systems 12, different workflows, different clinical applications, and use for diagnosis or treatment, there is a large variety in the voxel data and characteristics of the voxel data in medical imaging. Any one or more sets of voxel data representing intensity of return, density, attenuation, elasticity, motion, uptake, temperature, molecular spin response, other characteristics, or combinations thereof may be acquired by the medical imaging system 12.

The memory 18 is a graphics processing memory, video random access memory, random access memory, system memory, cache memory, hard drive, optical media, magnetic media, flash drive, buffer, database, combinations thereof, or other now known or later developed memory device for storing the set or sets of voxel data and/or data representing one or more surfaces. The memory 18 is part of the medical imaging system 12, part of a computer associated with the renderer 16, part of a database, part of another system, or a standalone device.

The memory 18 stores the hybrid volume/surface data. The medical scan data, surface, combined data set, reconstructions, rendering, and/or images are stored. Any data used for imaging or data in beginning, intermediate, or final stages of processing are stored for access by the renderer 16.

The representation of the surface stored by the memory 18 is a two- or three-dimensional representation. FIG. 2 shows a cylindrical surface 24. Surfaces of any shape may be provided, such as a surface modeling an organ, tool, or other object. For example, a medical tool that may be inserted into a patient is modeled, such as transesophageal (TEE) ultrasound probe. The surface may have a flat, curved, or both flat and curved portions. The surface may be open or closed. The surface may have any numbers of textures or surface properties (e.g., transparency, dullness, rough, flat, smooth, color, shininess, or gloss). The material of the surface is defined by any number of surface properties, or the material definition (e.g., plastic) indicates the surface properties.

The surface is a model representing an object not actually in the patient volume. Alternatively, the surface is a model representing an object in the patient volume. In yet other embodiments, the surface is detected from the voxel data and separately quantified or modeled (e.g., a segmented, implicit, or iso-surface). For example, an inserted tool (e.g., catheter, endoscope, stent, or valve) existing within the patient is detected and the surface of the tool identified by segmentation or other detection.

Any surface model may be used. In one approach, each voxel corresponding to the surfaces is flagged or used to define the surface. In another approach, a mesh of connected nodes defines the surface. The nodes may be at or may be separate from the voxel locations. The surface may be based on a fit mathematical representation. The surface definition has a same or different resolution as the volume or voxel data.

The location of the surface relative to the scanned volume is known or set. Where modeling is used, the location of the surface relative to the volume may be arbitrary or based on detected anatomical structure. Where segmentation of implicit structure is used to find the surface from the voxel data, the location relative to the volume is also determined. The location of the surface relative to the volume may be static or may change over time.

Due to the variety of medical applications, more than one surface may be of interest. There may be multiple surfaces, such as for different organs, different parts of an organ, different tools, different parts of a tool, or combinations thereof. The surfaces are independent of each other, such as having no common or intersecting locations. Alternatively, the surfaces contact or intersect, but are separately defined. There may be one, two, three, or more surfaces for a given scan volume.

The surface or surfaces may be formatted as an acceleration structure or structures. Any now known or later developed acceleration structures for computing ray intersections with the surfaces in a real-time or interactive environment may be used. Different visualization requirements (e.g., 4D visualization with animated surfaces vs. 3D visualization with static surfaces and/or mesh size) may result in different acceleration structure being used. The capabilities of the underlying computational architecture (i.e., the renderer 16) may result in different acceleration structure being used. In one embodiment, a Bounded Volume Hierarchies (BVH) or Kd-trees are used for 4D imaging. A BVH acceleration structures is constructed for each surface mesh loaded into the system or to be represented in the rendering. Multiples surfaces can be combined into a single acceleration if interaction with the individual components is not required. In other embodiments, a TRBVH or SBVH acceleration structures are used.

Specialized algorithms for building a surface intersection acceleration structure may be used for time-varying surface data during interactive rendering. Examples include GPU-based techniques for rapid reconstruction or techniques that allow for partial rebuilds. If only the location of the mesh is changed, the normal acceleration structure may be reused. For a time-varying surface, the acceleration structure may need to be rebuilt after each change using the GPU for interactive rendering.

The acceleration structure or mesh without the acceleration structure represents a geometry of the surface. The geometry and surface material information are unified into a single database. Alternatively, the geometry and surface material information are maintained separately. Further unification may be provided, such as a single database with the surface and the volume. Alternatively, the surface and volume are maintained separately.

For use with a graphics processing unit (GPU), the mesh data, acceleration structure (e.g., BVHs) and material definitions are packed into textures and uploaded to the GPU memory. Using the CUDA pipeline, the nodes (e.g., splitting positions for BVH), indices, and the triangle data are stored using flat arrays. For OpenGL, a similar approach may be used. Alternatively, the mesh, acceleration structure, and/or material definitions are used without packing to a texture.

The surface may indicate shader operations of the GPU or rendering. In one embodiment, a surface shader renders the surface geometry with a wireframe effect. The shader is a program to computer the shading at a point along the surface rather than a shading unit of a graphics processing unit. The wireframe is implemented as a surface shader effect for path tracing rather than drawing edges as is done in rasterization.

Thin beams or wires interconnect so that there are holes through the surface. The mesh defines the wireframe, and the surface properties indicate the light interaction with the wireframe. In another embodiment, the surface is a silhouette. A surface shader renders only the silhouette edges of the surface geometry. The outline of any thickness or width of an object is represented by the surface. A hole or interior may not be part of the surface. The surface properties, such as reflectance, opacity, or absorption, may vary spatially, such as by distance from an edge.

The memory 18 or other memory is a computer readable storage medium storing data representing instructions executable by the programmed renderer 16 for visualizing in medical imaging. The instructions for implementing the processes, methods, and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The user interface 14 is an input device with or without an output. Any input may be used, such as keyboard, button, slider, knob, track pad, mouse, track pad, or another sensor. The output may be on the display 20, an LED, light, or other output.

The user interface 14 is configured to receive input from the user. The input may configure the rendering. The user inputs a value or values for any number of rendering parameters, such as view direction, type of lighting, visual effect, or transfer function. For example, the user may interactively change one or more values of a setting. In one embodiment, the user rotates or alters the view direction for rendering. In other embodiments, the user selects the imaging application (e.g., heart imaging), resulting in loading of default settings. In alternative embodiments, a processor or the renderer 16 uses default or determined values for one, more, or all the settings.

When a setting is changed due to interaction, the rendering is performed again using the new setting. By rapidly re-rendering, such as at real-time rates, the interaction may appear smoother or appealing to the user.

The renderer 16 is a general processor, central processing unit, control processor, graphics processor, digital signal processor, three-dimensional rendering processor, image processor, application specific integrated circuit (ASIC), field programmable gate array (FPGA), digital circuit, analog circuit, combinations thereof, or other now known or later developed device for rendering an image from data. The renderer 16 is a single device or multiple devices operating in serial, parallel, or separately. The renderer 16 may be a main processor of a computer, such as a laptop or desktop computer, or may be a processor for handling some tasks in a larger system, such as in an imaging system. The renderer 16 is configured by hardware, firmware, and/or software.

In one embodiment, the renderer 16 is a graphics processing unit (GPU) or a graphics card with rendering code. A GPU is a massively parallel computation device. CUDA or OpenCL languages are used to program the GPU. In other embodiments, the x86-based Xeon Phi or custom FPGA/ASIC implementations are used. Path tracing includes modeling the scatter or bouncing paths of many light rays (photons), allowing for efficient scaling with multiple parallel computational devices. Multiple GPUs in a render node, GPU clusters, CPU/GPU hybrid systems, or other computational architectures may be used. Sample-based, tile-based, or frame-based distribution of the rendering may be used.

Any part of the renderer 16 may be used to generate the light ray path. For example, a shader or sub-shader of the GPU generates the light ray path. A programmable sub-shader is used to handle the light ray generation. The sub-shader may implement ray tracing, implement volumetric path tracing, simulate the surface behaving like a light source in the scene, and/or implement specialized non-photorealistic effects, such as wireframe rendering and silhouette rendering.

The physically-based renderer 16 renders pixels representing the 3D region of the patient. The renderer collapses or projects the 3D representation (i.e., volume data) of the object into two dimensions. The voxels are converted into pixels. Each pixel represents a point in a display or frame of data as if viewed by a person from a given camera position.

In one embodiment, the physically-based renderer 16 renders a photorealistic image of the 3D region of the patient. Any physically-based rendering algorithm capable of computing light transport may be used, such as path tracing, unbiased path tracing, Monte-Carlo path tracing, or Metropolis light transport. The physically-based rendering simulates the physics of light propagation to create an image instead of accumulating volume samples with local illumination along viewing rays from the camera, as is done for traditional direct volume rendering. In path tracing implemented for physically-based rendering, the paths of light or photons, including due to scattering and absorption, are modeled and used for rendering. Photons are repetitively modeled using stochastic scattering and absorption, creating light paths. The physically-based rendering result builds up over time as the rendering may rely on probabilistic scattering and tracing millions of light paths.

The surface rendering support is added over a volumetric path tracer for medical imaging data. FIG. 2 shows one example light ray path 26. The light ray path 26 is formed by any number of vectors (i.e., given angle and magnitude of light). In the example of FIG. 2, the light ray path 26 includes two scatter points and one termination point. The first scatter point is from the surface 24. The scatter may result in the light intensity or magnitude reducing by any amount. The second scatter point is from a voxel of the volume. The scatter may result in the light intensity or magnitude reducing by any amount. The termination point is at a voxel of the volume. The light is absorbed at that voxel.

Other light ray paths 26 with the same or different vector components are generated. The initial and/or subsequent vectors are the same or different. Even for a light ray path 26 starting out with a same initial vector (angle and intensity), the initial scatter point may be different, resulting in a different light ray path 26. The renderer 16 is configured to generate the light ray paths 26 stochastically. Any number of light ray paths may intersect with a given voxel and/or the surface 24.

In Monte-Carlo path tracing, a random number generator determines up to what opacity a ray is traced through the volume. Then, depending on the gradient magnitude, the ray might be scattered. The scatter event may occur at a voxel before reaching the surface. If not, then the scatter may occur at the intersection with the surface. If not, then the scatter may occur at a voxel beyond the surface. If not, then the light ray path 26 may extend through the volume without scattering. The scatter points indicate where the depth may be sampled. Due to the random sampling in physically-based volume rendering, different potential depths are considered. The scattering occurs at different depths due to the stochastic nature of the rendering. The chance of scattering during the ray traversal is a consequence of the Monte Carlo sampling of the light paths. Intuitively, denser volume regions are expected to act more like local surfaces, therefore there is a higher chance of scattering. In terms of the Monte Carlo sampling, this is done by randomly selecting a voxel intensity threshold, then the denser regions reach that threshold more quickly as voxel opacities are accumulated along the ray. In physically-based volume rendering, a single or given pixel produced from the volume renderer contains the projection of points along a viewing ray through the volume. Therefore, it is not possible to define a single depth value for that pixel in the general case.

A bidirectional reflectance distribution function (BRDF) is provided for each voxel and the surface. The BRDF controls the scattering parameters, including the intensity of any scattered (reflected) light. The BRDF determines how much of the light takes a path of no scatter. For example, a shiny surface may reflect most light towards an outgoing light direction (e.g., towards an observer) while a diffuse surface may reflect light in a variety of random directions. The BRDF models this scattering behavior. The intensity of the scatter is stochastic based on the distribution of the BRDF. The BRDF for the voxels is based on the properties of the tissue represented at the voxel, the voxel intensity, and/or the intensities or pattern of intensities in a region around and including the voxel. The BRDF for the surface is the same for the entire surface or may vary over different locations of the surface. The BRDF of the surface is based on the surface properties.

The direction of the scatter is or is not stochastic. For voxels, the direction may be based, at least in part, on a gradient of voxel intensities for surrounding voxels. For the surface, the direction may be based on a normal to the surface. The texture of the surface and/or surrounding voxels may also influence the direction, such as a rough surface more likely scattering over a broader range of angles than a smooth surface. The surface properties at a point of intersection of the light ray path 26 with the surface are used to compute the next vector in the light ray path 26. Surface properties, such as material, normal, and texture coordinates, are reconstructed for the light scatter location and a new light ray (e.g., vector of the light ray path 26) is computed.

The process continues as the light is simulated progressing through the volume. Monte-Carlo sampling is used to follow many individual light paths in parallel (e.g., follow ray to next scatter location, terminate ray by some criterion (e.g., 4 scatter events for ray), generate X number of additional rays at a scatter point (e.g., 64 rays based on BRDF probabilities), for each ray repeat (e.g., follow ray to next scatter location . . . )). The light ray continues until the light ray path 26 leaves the scene or volume, reaches a light source in the volume, is absorbed, or satisfies some criterion. The absorption may be handled stochastically, based, at least in part, on intensity, gradient or surface normal direction, and/or voxel or surface properties.

The rendering results in a photorealistic image. For a given set of values of rendering parameters, a single image is output. The rendering parameters are a default set, set by the user, determined by a processor, or combinations thereof. The rendering parameters may include data consistency parameters. Data consistency parameters include windowing, scaling, level compression, data normalization, or others. The rendering parameters may include transfer function design parameters. Transfer function design parameters include classification look-up tables, multi-dimensional transfer functions, tissue-specific transfer functions, or other transfer functions. The rendering parameters may include lighting design parameters. Lighting design parameters include type of virtual lights, position of the virtual light sources, orientation of the virtual light sources, image-based lighting sources, ambient lighting, or others. The rendering parameters may include viewing design parameters. Viewing design parameters include type of camera, position of the camera, orientation of the camera, intrinsic parameters for viewing, or others. One or more use-case specific parameters may be provided. Use-case specific parameters are settings specific to a given use, such as a particular camera position for a given type of medical report or use of two cameras for stereoscopic viewing.

The parameters may be specific to physically-based rendering, such as internal render properties. The setting for any parameter for path tracing, unbiased path tracing, Monte Carlo rendering, global (i.e., indirect) illumination, or other simulations of light propagation may be used. For example, a global albedo or reflectance coefficient, which describes the relative importance of light scattering versus light absorption, may be used. During path tracing, different levels or amounts of scattering and/or absorption are modeled for different locations based on the data representing the 3D object. The scattering and/or absorption of photons is modeled for each sampling point (e.g., voxel). Transparency, reflectivity, surface roughness, and/or other properties derived from the data may be modeled in the physically-based rendering. Albedo may be a per-material property for the different tissue classes in the volume data.

For unified path tracing of the volume and surface, a reflectance coefficient is used for the surface in addition to the coefficients for the voxels. The same path tracing generation is used while accounting for both the volume and the surface. The surface provides another opportunity for scattering, absorption, or termination (e.g., as a light source) handled in the path tracing operation.

As part of generating the light ray path 26, the renderer 16 is configured to check for the three-dimensional surface 24 along the light ray path 26. As each vector is created, the renderer 16 checks for intersection with the surface 24. During the light transport simulation, every light ray is checked for intersection with surfaces 24 before the ray advances through the volume data. For each new vector, the check is performed. The check is performed before determining a next scatter event or performed after determining the location of the next scatter event based on the voxels of the volume and before computing the next vector as the light may instead scatter from the surface.

The check relies on the geometric position of the surface. Where the surface is packed as a texture in a GPU pipeline, the mesh and/or material definition in the texture are checked. The mesh, instantiated as triangles, provides a location of the surface. The material definition provides the information used to determine whether there is scattering or not from the surface.

To accelerate the check for geometric intersection of the vector with the surface, the acceleration structure for the surface may be used. For example, the check is against BVHs representing the geometry as a hierarchy of split scenes. The check works through the hierarchy to determine the point of intersection, if any.

Referring again to FIG. 1, the renderer 16 uses the check of unifying the surface with the path tracing for the volume. Where the light ray path does not scatter or terminate based on the voxel data prior to the three-dimensional surface, the renderer 16 determines whether scatter occurs from the three-dimensional surface. If the surface is reached before the volumetric light scatter location, light may be scattered from the surface instead. The renderer 16 is configured to determine the scatter from the three-dimensional surface with the BRDF for the three-dimensional surface at the point of intersection of the light ray path with the three-dimensional surface.

If scatter does not occur on the surface, then the light may progress to the voxel-based scatter location beyond the surface. For example, a plurality of light ray paths intersects the surface with a same intensity and direction (i.e., same vector resulting in intersection). Some or none of the light rays may pass through the surface, depending on the surface properties and corresponding probabilities of scattering assigned to the surface. Some or all the light rays may scatter from the surface, depending on the surface properties and corresponding probabilities of scattering assigned to the surface. Some or all the light rays may terminate at the surface, depending on the surface properties and corresponding probabilities of absorption.

Where the surface is modeled as a light source, the light rays may terminate at the surface. The intensity of the light source may control the probability of termination, such as half the light rays terminating based on the surface being a light source (high intensity) and the other half of the light rays scattering or being absorbed based on path tracing (i.e., based on BRDF). The ratio may be fixed or may be subject to stochastic distribution. Any ratio may be used where the ratio controls, at least in part, the intensity of the light source.

The surface properties of the surface, as integrated with the path tracing for the volume, may provide other illumination effects. More than one surface with the same or different illumination effects may be included. Greater shadowing and/or ambient occlusion occur for voxels associated with viewing through a greater number of surfaces. Using unified path tracing for both surface and volume allows for accurate simulation of transparency. Applications include surgical planning and blood vessel or organ visualization.

The renderer 16 is configured to generate an image as a function of the hybrid volume/surface data. The image is a single representation of the patient volume and surfaces using both types of data. In other embodiments, more than one or more than two representations of the patients may be provided, such as a rendering multi-planar reconstruction images from the scan data.

The rendered image provides two-way interaction between the volume and the three-dimensional surface. For example, the surface may effect lighting of the volume, such as glow from the surface lighting adjacent tissue represented by the scan data of the voxels, and the tissue represented in the voxels may cause shadowing on the surface. Accurate light interaction between the volume and transparent surfaces are rendered. This two-way interaction is handled within the surface shading, where the light ray is stochastically reflected or transmitted through the surface based on the material properties.

The output of the renderer 16 is a 2D grid of pixels that matches the resolution of the display output device. Higher or lower resolution may be provided. In one embodiment, this output is used as-is and without any modification to the rendering algorithm. Each pixel represents a visual characteristic for a different area. For example, each pixel includes a color value (e.g., red, green, blue (RGB) value). A scalar or grey scale value may be used instead of or as the color.

The display 20 is configured to display the image. The display 20 is a monitor, LCD, projector, plasma display, CRT, printer, or other now known or later developed device for outputting visual information. The display 20 is configured by receiving images, graphics, or other information from the renderer 16, memory 18, or medical imaging system 12.

The display 20 receives the image rendered from the hybrid volume and surface model by the renderer 16. The image is output to the user. The image includes a photorealistic rendering of the volume with effects from the surface. The image is a function of the light ray paths. The image output by the renderer 16 is based on the integration with contribution altered by the surface or surfaces. The image represents the internal region of the patient and the three-dimensional surface.

In one embodiment, the image changes over time, such as due to user interaction, on-going acquisition of medical scan data, and/or continued addition of information from further light path simulation. For example, the user positions a clipping plane or planes so that different parts of the patient volume are masked. As a result, the rendering shows the internal region from the scan data not clipped or that intersects the clipping plane. As another example, different segmentation of the volume is used to generate images of different tissues of the patient. One rendered image is replaced with another rendered image based on the change in the rendering parameter, such as the view direction, segmentation, or clipping plane position. Side-by-side display of images with different rendering may be used.

Figure 3:
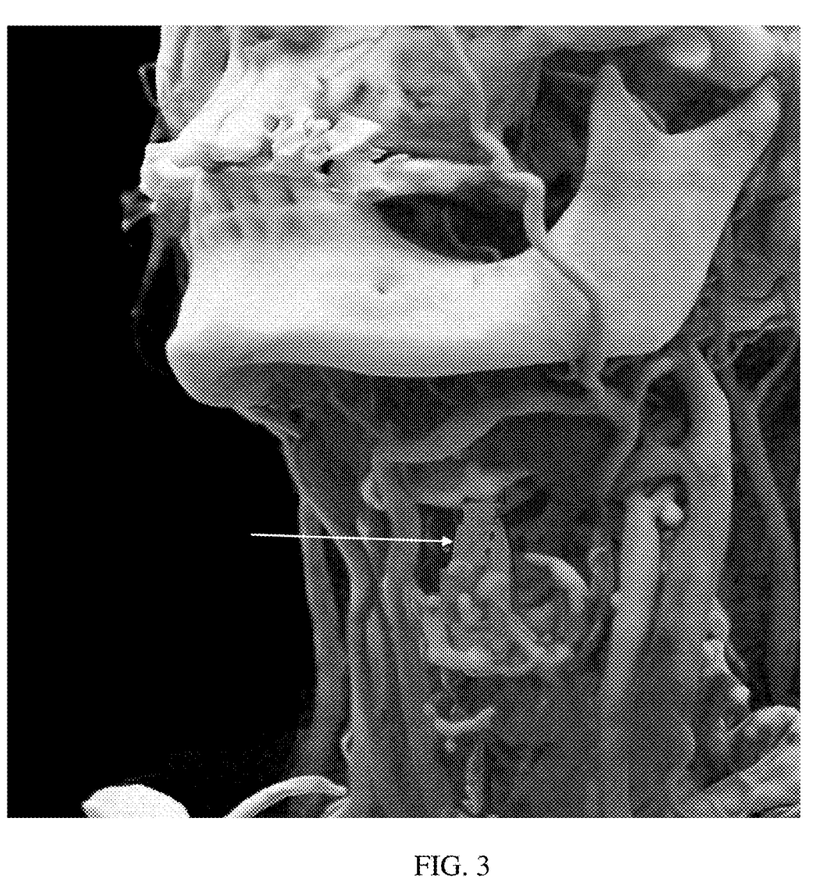
FIG. 3 shows an example photorealistic rendering of a volume from path tracing with scattering from an embedded surface model.

FIG. 3 shows one example photorealistic rendering using Monte-Carlo path tracing. A volumetric CT data set segmented to provide bone and vessels is fused with a mesh surface of a TEE probe. An arrow is added to indicate the rendered probe surface. The surface shader for the probe is configured to simulate a faint light source to demonstrate the two-way interaction between the volume and the mesh in the unified path tracing. In color, the rendered image shows a slight tent and increased light intensity from the light color of the probe on the tissue viewable beyond the probe. Shadows from the vessels in front of the probe are shown on the probe.

FIG. 4 shows a method for visualization of surface and volume information of a patient in medical imaging. Path tracing is used to render an image from volume information and one more surfaces. Rather than rendering the surface through rasterization, the same path tracing for rendering from the volume is used to locate the surface relative to the volume being rendered and to alter the light paths to account for the surface and surface characteristics. This unified path tracing approach may allow for efficient modeling of various effects of the surface relative to the volume.

The method is implemented by the system 10 of FIG. 1 or another system. For example, act 30 is performed by a medical scanner, and acts 32-38 are performed by a renderer. Any one or more of the acts may be performed by different devices.

The acts are performed in the order shown or other orders. For example, acts 34 and 36 are performed in the order shown, a reverse order, or simultaneously. Acts 34 and 36 may be performed as part of implementing act 32.

Additional, different, or fewer acts may be provided. For example, an image is not generated on a display in act 38, but instead the image is saved or transferred. As another example, user input is provided for interacting with the rendering.

In act 30, a medical scanner acquires a set of voxels. The voxels represent a volume of the patient. A patient is scanned with a medical imaging scanner. The interior of the patient is scanned, such as with MR, x-ray (e.g., CT), or emission tomography (e.g., PET or SPECT). The scan is performed in any format, such as detecting emissions along lines of response, acquiring k-space data at magnetic gradient defined locations, or acquiring projections through the patient with x-rays from different directions. Because of the scan, data representing the interior of the patient in an N×M×O region is acquired, where N, M, and O are integers greater than 1.

A processor, such as the renderer, or the medical imaging system reconstructs the volume representing, at least in part, the internal portion of the patient. Any reconstruction from the scan data may be used. The reconstruction determines scalar or other values for each of a plurality of voxels distributed in three dimensions.

A predefined surface or a surface extracted from the volumes is identified. The surface is a mesh, segmentation, or other representation of a specific surface rather than an implicit surface. The surface may be a virtual object to be placed in the volume, a model of an actual object to be placed in the patient, or a segmented structure determined from the scan data.

In act 32, the renderer performs path tracing. Light rays are path traced through the volume with stochastic scattering for voxels of the volume. The path tracing also includes scattering from the surface. BRDFs for the voxels and for the surface are used to generate the paths of light.

Due to scattering, the light ray path includes different vectors through the patient volume. The different component vectors of each light ray path result from none, one, or more scatter events. For some or all the light ray paths intersecting with the surface, a vector based on scatter from the surface is generated. Similarly, voxels may cause or be associated with scatter.

For each scatter event, the renderer determines a direction and intensity for the resulting vector. The surface properties determine or influence the direction and/or intensity of scatter from the surface. The voxel or voxel region properties influence the direction and/or intensity of scatter from the voxel.

The path tracing is performed for the volume. For the initial vector and/or a vector after any scatter from a voxel or surface, the renderer checks for interaction of the light ray or vector with the surface in act 34. Intersections of the light rays used for the path tracing with any surface positioned in the volume are determined. Each vector in the volume intersects none, one, or more surfaces. The locations of the intersections are determined.

A brute force approach may be used. Alternatively, an acceleration structure is used to determine the intersections. Any search strategy, such as hierarchal cubes or BVH, may be used to reduce the processing to locate intersections. By traversing the acceleration structure, the intersections are found.

As part of path tracing for the volume in act 32, the intersections determined in act 34 are used for scattering from the surface in act 36. Some or all vectors or light rays that reach the surface intersection are scattered from the surface. The scattering from the surface is performed where the light rays do not scatter from any voxels along a given vector prior to the intersection determined in act 34.

The scattering from the surface is handled stochastically, such as is done for the voxels. For example, in Monte Carlo sampling, an opacity threshold is selected stochastically. If the accumulated opacity from the volume traversal is not sufficient to pass the threshold and trigger a scatter event computation from the volume data, then the surface-ray interaction is computed based on surface characteristics. The probability of light passing through the surface and the refraction is computed from surface opacity and material properties. Light scattering direction is computed by evaluating the surface BRDF. In another example, an opacity is selected stochastically. Where no voxels have sufficient opacity to scatter until the light ray reaches the surface, then the surface is checked for sufficient opacity or a termination condition. Whether scattering occurs is controlled based on the BRDF and the sampling method. The BRDF for the surface may be the same or different as the BRDFs used for the volume rendering. When a scatter event occurs during the volume traversal, that position is treated as a local surface using the gradient from the voxel data as the surface normal. The BRDF is defined for that local surface relative to the voxel. For the added surface, the BRDF for that added surface is used.

Some light rays may not scatter from the surface. Light rays may terminate or pass through the surface. The ratioS of pass through, scatter, or termination is fixed or influenced to provide the desired two-way effects.

The scatter generates a new vector in the light ray path. The new vector is based on the surface properties. The new vector from any voxel scattering is based on the voxel properties.

In act 38, one or more medical images are generated. The path tracings and corresponding scattering forming the paths are used to generate the medical image. The light ray paths indicate illumination for voxels rendered to the image. For each pixel in the 2D grid that forms the image, a camera model is used to compute the direction of the primary viewing ray. The path tracing connects this viewing ray, though a sequence of scatter events, with a light source, providing the light path to the viewer. The 2D image is the camera film or the camera sensor. For a pin-hole camera, if the focal point is behind this sensor, the viewing rays go from the focal point through each pixel on the "sensor" to produce the image. With this, complex cameras, like a large aperture with a fish-eye lens, may be simulated. Due to the two-way effects from unifying the path tracing of the volume to include the surface, various visual effects may be included in the image, such as ambient occlusion. Surface effects, such as silhouetting or wireframe rendering, may be included.

The rendered image or images are displayed by the renderer 16 on the display 20. The image represents the patient and a surface or surfaces in the patient. A photorealistic representation of the surface interaction with the volume is provided in combination with a medical scan representation of at least part of an interior of the patient.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A system for visualization of surface and volume information in medical imaging, the system comprising:
    a medical imaging system configured to scan an internal region of a patient and generate voxel data representing a volume comprising the internal region;
    a memory configured to store a three-dimensional surface within the volume;
    a renderer configured to generate a light ray path through the volume as part of path trace rendering, check for the three-dimensional surface along the light ray path, where the light ray path does not scatter or terminate based on the voxel data prior to the three-dimensional surface, and determine scatter from the three-dimensional surface; and
    a display configured to display a rendered image output by the renderer and based on the path-trace rendering, the rendered image representing the internal region and the three-dimensional surface,
    wherein the renderer is configured to provide two-way interaction between the volume and the three-dimensional surface.

2. The system of claim 1 wherein the path trace rendering comprises Monte-Carlo-based path tracing.

3. The system of claim 1 wherein the light ray path includes a plurality of vectors connected at points of scattering, the renderer configured to check for each vector.

4. The system of claim 1 wherein the renderer is configured to determine the scatter from the three-dimensional surface with a bidirectional reflectance distribution function for the three-dimensional surface at a point of intersection of the light ray path with the three-dimensional surface, is configured to generate a new vector of the light ray path from surface properties of the three-dimensional surface at the point of the intersection, and is configured to check for the new vector.

5. The system of claim 1 wherein the light ray path is a first light ray path, the renderer configured to generate second and third light ray paths with a same vector to the three-dimensional surface as the first light ray path, the second light ray path passing through the three-dimensional surface and the third light ray path scattering from a voxel of the volume prior to the three-dimensional surface.

6. The system of claim 1 wherein the light ray path is one of a plurality of light ray paths, the renderer configured to generate the light ray paths of the plurality stochastically, the rendered image being a function of the light ray paths of the plurality.

7. The system of claim 1 wherein the renderer comprises a graphics processing unit and wherein a sub-shader of the graphics processing unit is configured to generate the light ray path.

8. The system of claim 7 wherein the three-dimensional surface comprises a mesh and material definition, and wherein the renderer is configured to check with the mesh and material definition packed into a texture of the graphics processing unit.

9. The system of claim 1 wherein the three-dimensional surface comprises a wireframe or a silhouette.

10. The system of claim 1 wherein the renderer treats three-dimensional surface as a light source in the path tracing rendering, the light ray path terminating at the three-dimensional surface.

11. The system of claim 1 wherein the renderer is configured to check using an acceleration structure for the three-dimensional surface.

12. The system of claim 1 wherein the light ray path is one of a plurality of light ray paths intersecting the three-dimensional surface, wherein the three-dimensional surface comprises a model of an inserted medical tool, and wherein the renderer terminates a first fraction of light ray paths at the three-dimensional surface as a light source and calculates scatter for a second fraction of the light ray paths at the three-dimensional surface.

13. A method for or visualization of surface and volume information in medical imaging, the method comprising:
    path tracing light rays through a volume with stochastic-based scattering for voxels of the volume;
    determining intersections of the light rays used for the path tracing with a surface positioned in the volume;
    stochastically scattering of the light rays from the surface for the intersections to provide a two-way interaction between the volume and the surface; and
    generating a medical image of the patient based on the path tracing and scattering for the voxels and for the surface.

14. The method of claim 13 wherein the scattering for voxels and the scattering from the surface comprises scattering based on bidirectional reflectance distribution functions for the voxels and for the surface, the bidirectional reflectance distribution function for the surface being different than the bidirectional reflectance distribution function for the voxels.

15. The method of claim 13 wherein determining the intersections comprises determining the intersections with an acceleration structure.

16. The method of claim 13 wherein the scatterings from the surface are performed where the light rays do not scatter from any voxels prior to the intersections, paths of the light rays due to the scattering from the surface being based on surface properties and paths of the light rays due to the scattering for the voxels being based on voxel properties.

17. The method of claim 13 wherein the light rays comprise a first set of light rays, the scattering of the first set of light rays from the surface being scattering just the first set of light rays, a second set of light rays passing through the surface and a third set of light rays terminating at the surface.

18. A method for or visualization of surface and volume information in medical imaging, the method comprising:
    acquiring from a medical scanner voxels representing a patient volume;
    generating a light ray path of a plurality of different vectors through the patient volume, at least one of the vectors based on scatter from a surface positioned in the volume and at least one of the vectors based on scatter from a first voxel of the voxels, the generating providing a two-way interaction between the surface and the voxels; and
    generating an image from the light ray path.

19. The method of claim 18 wherein generating comprises determining a direction and intensity for the vector for scatter form the surface based on surface properties and determining a direction and intensity for the vector for scatter from the first voxel based on voxel properties.

\* \* \* \* \*